UNITED STATES PATENT OFFICE.

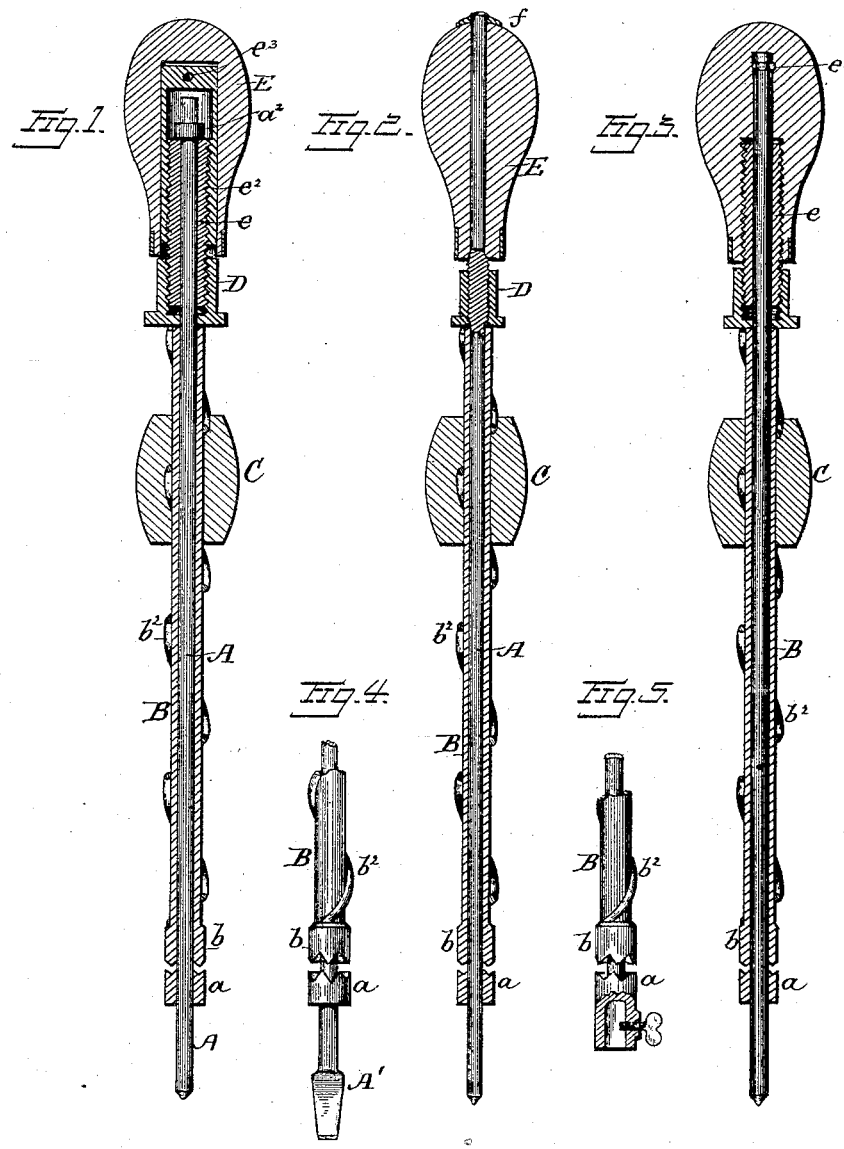

JAMES C. SPENCER, OF ROCHESTER, ASSIGNOR OF ONE-HALF TO JAMES G. SMITH, OF JAMESTOWN, NEW YORK.

HANDLE FOR SCREW-DRIVERS AND OTHER TOOLS.

SPECIFICATION forming part of Letters Patent No. 354,359, dated December 14, 1886.

Application filed August 21, 1886. Serial No. 211,526. (No model.)

*To all whom it may concern:*

Be it known that I, JAMES C. SPENCER, a citizen of the United States, residing at Rochester, in the county of Monroe and State of New York, have invented certain new and useful Improvements in Handles for Screw-Drivers and other Tools, of which the following is a specification, reference being had therein to the accompanying drawings.

My invention relates to improvements in devices to rotate screw-drivers, hand-drills, bits, augers, &c.; and the objects of my improvements are to provide a handle through which various tools may be rotated at will, either in one direction only or intermittently in opposite directions, according to the location of a nut upon one end of the spindle of the tool, or upon its support, and the location of the members of a clutch at the opposite end. I accomplish these objects by the construction illustrated in the accompanying drawings, in which—

Figure 1 represents a longitudinal section of a tool constructed in accordance with my invention. Figs. 2 and 3 are longitudinal sections of modifications of the same. Fig. 4 represents in side view the clutch at one end of the tool provided with a tapering bit, as a screw-driver; and Fig. 5 represents the same end provided with a socket to receive various tools.

In the drawings, A represents the spindle to be rotated, and having close to its lower end one member, $a$, of a clutch having its upper surface provided with inclined teeth. Surrounding the spindle is a tube, B, carrying at its lower end the member $b$ of a clutch having inclined teeth made to engage with the teeth of the member $a$. The tube B has coiled upon its surface a worm, $b^2$, to rotate it by means of the hand-nut C, placed thereon, while the latter is moved up and down along the surface of the tube and its worm. To cause the spindle to be rotated back and forth while the hand-nut is moved up and down, a nut, D, is made to rest upon the upper end of the tube B, to retain the teeth of the two members $a$ $b$ of the clutch interlocked and united; but when it is desired to have the tool at the lower end of the device rotate in one direction only—as, for example, when a screw-driver, A', or an auger is used therewith—the clutch members are permitted to be disconnected by running up the nut D a short distance upon its screw-threaded stem, and thus permitting the tube B to revolve freely upon its spindle, while the hand-nut C is made to travel upward upon said tube; but when the hand-nut is again made to travel away from the upper handle, E, the first part of the motion of said hand-nut unites the members of the clutch and causes the spindle A to revolve with the tube B.

Various means may be used to connect the screw-threaded stem $e$ of the nut D with the handle. In Fig. 1 the screw-threaded stem $e$ is made to enter a cap, $e^2$, and it may be made integral therewith, and the cap $e^2$, after being driven into the handle E, may be retained immovably connected therewith by a pin, $e^3$, passing through the upper end of said cap and through the handle, or by other suitable means. In said Fig. 1 the upper end of the spindle A has a collar, $a^2$, that rests against the upper end of the screw-threaded spindle and prevents the withdrawal of the spindle A. In Fig. 3 the cap $e^2$ is dispensed with, and the screw-threaded stem $e$ is screwed directly into the handle E, and the withdrawal of the spindle A is prevented by a pin, $e^3$, passing transversely through the handle and engaging with a collar on said spindle. In Fig. 2 the nut D is made to engage with screw-threads cut upon the spindle A, and the upper end of said threads is made conical, or provided with a collar to abut against the lower end of the handle, while the upper end of the spindle is provided with a washer, $f$, and is riveted thereon to retain it connected with the handle.

Having now fully described my invention, I claim—

A tool-handle consisting of a spindle, a tube inclosing it, a spiral worm upon said tube, and a hand-nut upon the tube and worm, with the members of a clutch upon one end of the spindle and upon one end of the tube, and a nut, D, adapted to bear upon the opposite end of the tube, substantially as and for the purpose described.

In testimony whereof I affix my signature in presence of two witnesses.

JAMES C. SPENCER.

Witnesses:
 Z. L. DAVIS,
 GEORGE F. PARRY.